Aug. 22, 1967 J. R. RADEK 3,337,078

KNOCK-DOWN MERCHANDISE STORAGE EQUIPMENT

Filed April 1, 1965 5 Sheets-Sheet 1

INVENTOR
John R. Radek
Frank H. Marks
Nathan N. Kraus,
Att'ys

INVENTOR
John R. Radek
Frank H. Marks
Nathan N. Kraus,
Attys

INVENTOR
John R. Radek
Frank H. Marks
Nathan N. Kraus
Att'ys

INVENTOR
John R. Radek
Frank H. Marks
Nathan N. Kraus,
Att'ys

INVENTOR
John R. Radek
Frank H. Marks
Nathan N. Kraus,
Att'ys 3,337,078
Patented Aug. 22, 1967

3,337,078
KNOCK-DOWN MERCHANDISE STORAGE EQUIPMENT

John R. Radek, Hinsdale, Ill., assignor to Ready Metal Mfg. Co., Chicago, Ill., a corporation of Illinois
Filed Apr. 1, 1965, Ser. No. 444,771
8 Claims. (Cl. 220—6)

My invention relates to knockdown merchandise storage and display equipment and may be considered in the nature of improvements on my invention disclosed in my copending patent application Ser. No. 335,329, filed Jan. 2, 1964.

Broadly considered, my invention has to do with collapsible sheet metal cabinetry especially designed for housing and displaying merchandise in a retail store or the like, although suitable for other applications.

In said copending application I disclose knockdown framing in supporting combination with merchandise storage and display means such as tables, drawers, bins and the like.

A particular object of my present invention is to provide knockdown sheet metal merchandise storage equipment of the class described which may be efficiently fabricated by mass production methods at relatively low cost.

Another object is to provide equipment of the type referred to which may be conveniently shipped in collapsed or knockdown condition occupying a minimum of bulk and hence at a minimum of packing and shipping expense, and which may be easily and quickly set up by a person of little or no mechanical skill and with few tools, if any.

A particular object of my invention is to provide an improved drawer for the storage of merchandise in a cabinet embodying my invention, which drawer may be assembled at the factory, packed and shipped in collapsed condition, so as to require a minimum of packing material and be capable of shipment at minimum cost because of the reduced bulk, and which may be erected in a minimum of time by an unskilled person. According to my invention, the drawer walls are hingedly connected to the bottom panel, permitting their erection in a minimum of time with no possibility of erroneous assembly.

A further object is to provide a drawer of the character referred to which will be extremely rigid and certain in operation and having a long and efficient service life.

Various other objects and advantages will become apparent to those skilled in the art as the description proceeds.

Referring now to the drawings forming a part of this specification and illustrating preferred embodiments of my invention, FIG. 1 is a side-front perspective view of a new and improved drawer embodying my invention, lacking a decorative front panel which is normally provided;

Figure 1:
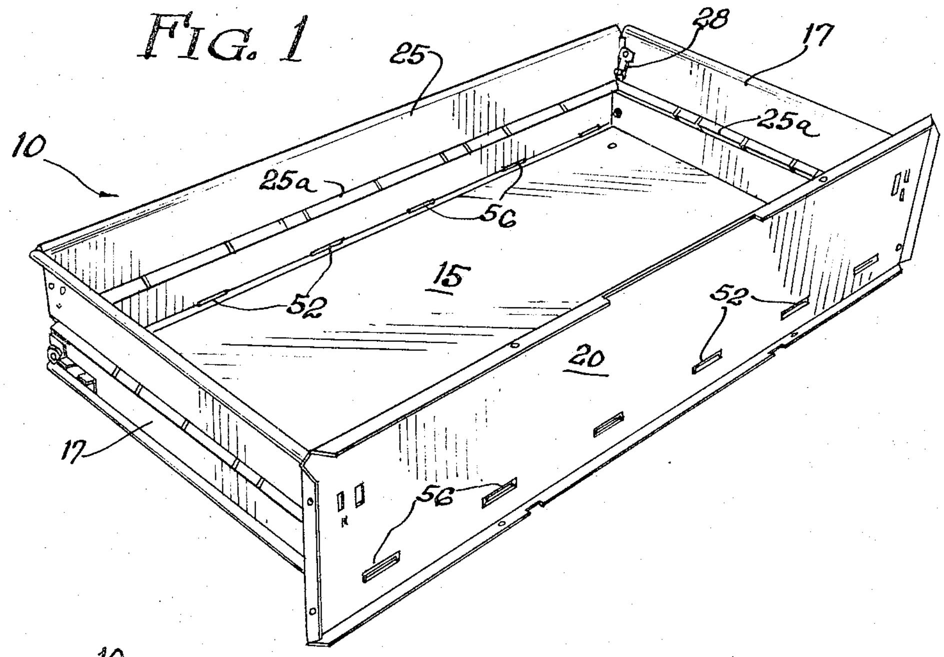

Referring first to FIGS. 1–7, inclusive, my invention contemplates a new and improved collapsible drawer 10 adapted to be supported in a cabinet frame of any suitable type, which may be of knockdown character as shown in my aforesaid pending application. In the embodiment here illustrated said drawer 10 comprises a bottom panel 15, side panels 17, 17, a front panel 20 and a back panel 25.

The aforesaid panels are preferably formed of sheet metal, the bottom panel 15 being hingedly connected to the side, front and back panels, the hinges 22 (FIGS. 3 and 4) being of such character that, when the drawer is collapsed for shipment, the side panels 17, 17 will lie in substantially the same plane as the bottom panel and in extension thereof while the front and back panels can be folded from their erected position into a position overlying and substantially parallel to the bottom panel. This arrangement makes possible an extremely flat package for shipment.

In the erection of the drawer, the side panels 17 will be raised about their respective hinges toward bottom panel 15 from their horizontal position (FIG. 3) to their erect positions, whereas the front and back panels will be rotated about their respective hinges in a direction away from said bottom panel to their erect positions.

The aforesaid side, front and back panels may be provided with suitable stiffening means, such as the longitudinal embossed ribs 25*a*.

Figures 5, 6, 7:
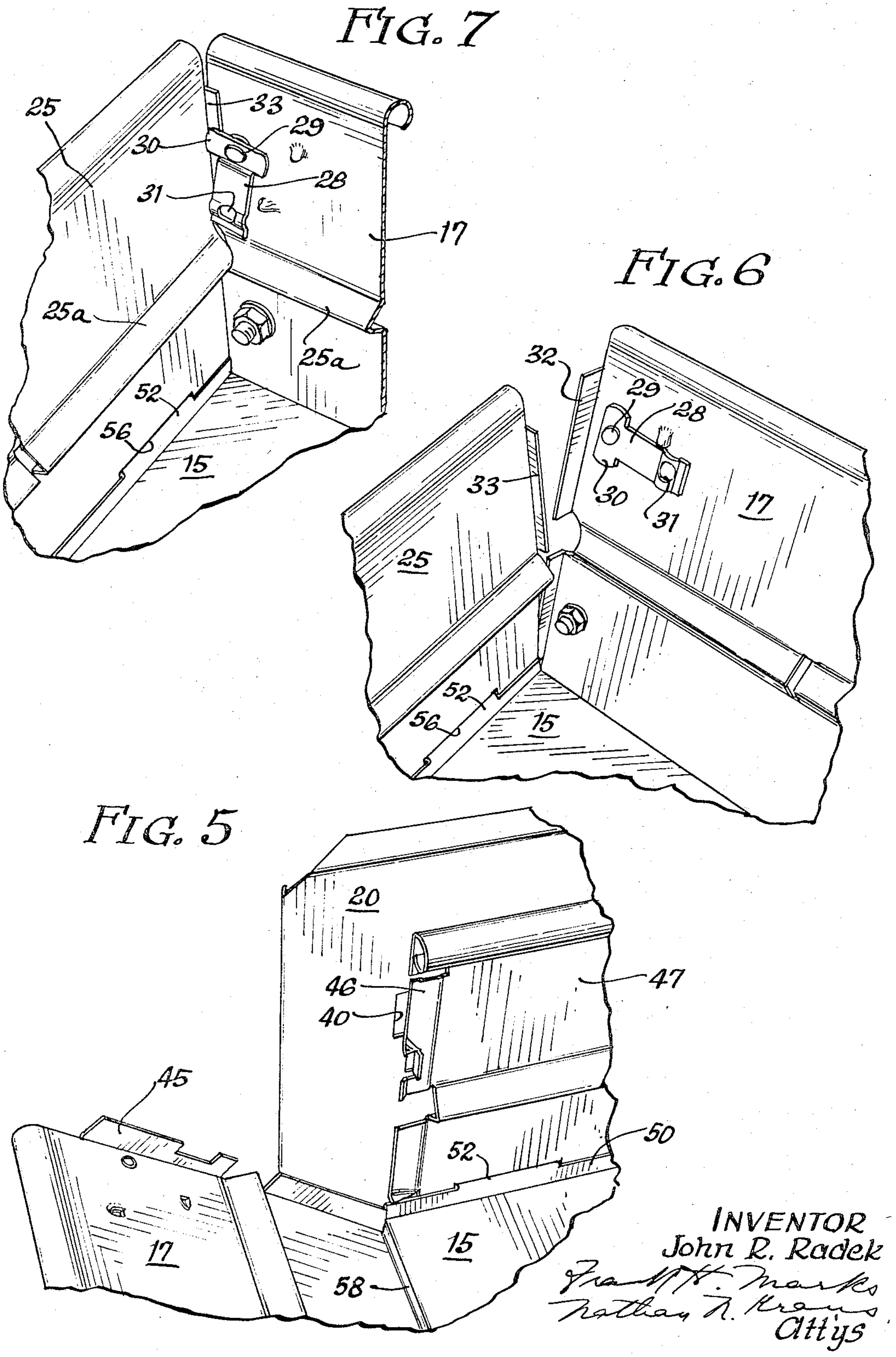
FIG. 5 is a fragmentary perspective view on an enlarged scale showing adjacent corner portions of a disassembled side and front panel of the same drawer in process of erection.
FIG. 6 is a similar view showing adjacent corner portions of a side and back panel.
FIG. 7 is a similar view to FIG. 6 showing the final locked condition of said side and back panels.

Suitable means is provided for locking the upright panels together where their adjacent side-edges abut. As an example of such locking means, I may provide a pivoted latch or dog 28 (FIGS. 6 and 7) pivoted as at 29 adjacent the corner and on the inner face of said side panels 17 and rotatable within an arc of about 90°. Said side panels will be provided with a flange 32 extending normally from the edge thereof adjacent latch 28, while back panel 25 will have a similar flange 33 bent normally from the corner thereof. Said latch 28, at the end adjacent pivot 29, has a normally extending ear 30 for locking engagement with flange 33, as seen in FIG. 7. (Ear 30 may be duplicated on the opposite side of bar 28 to avoid providing right and left-hand dies.) Latch bar 28 may be embossed and perforated as at 31 to facilitate manipulation.

For securing the side panels to the front panel, a similar latch or dog 37 (FIG. 8) is pivoted as at 38 adjacent the upper front portion of the side panels 17 and a mating slot 40 is provided in the front panel adjacent each of said latch members 37.

Obviously, a sliding latch might be used in lieu of a pivoted one.

Figures 3, 4:
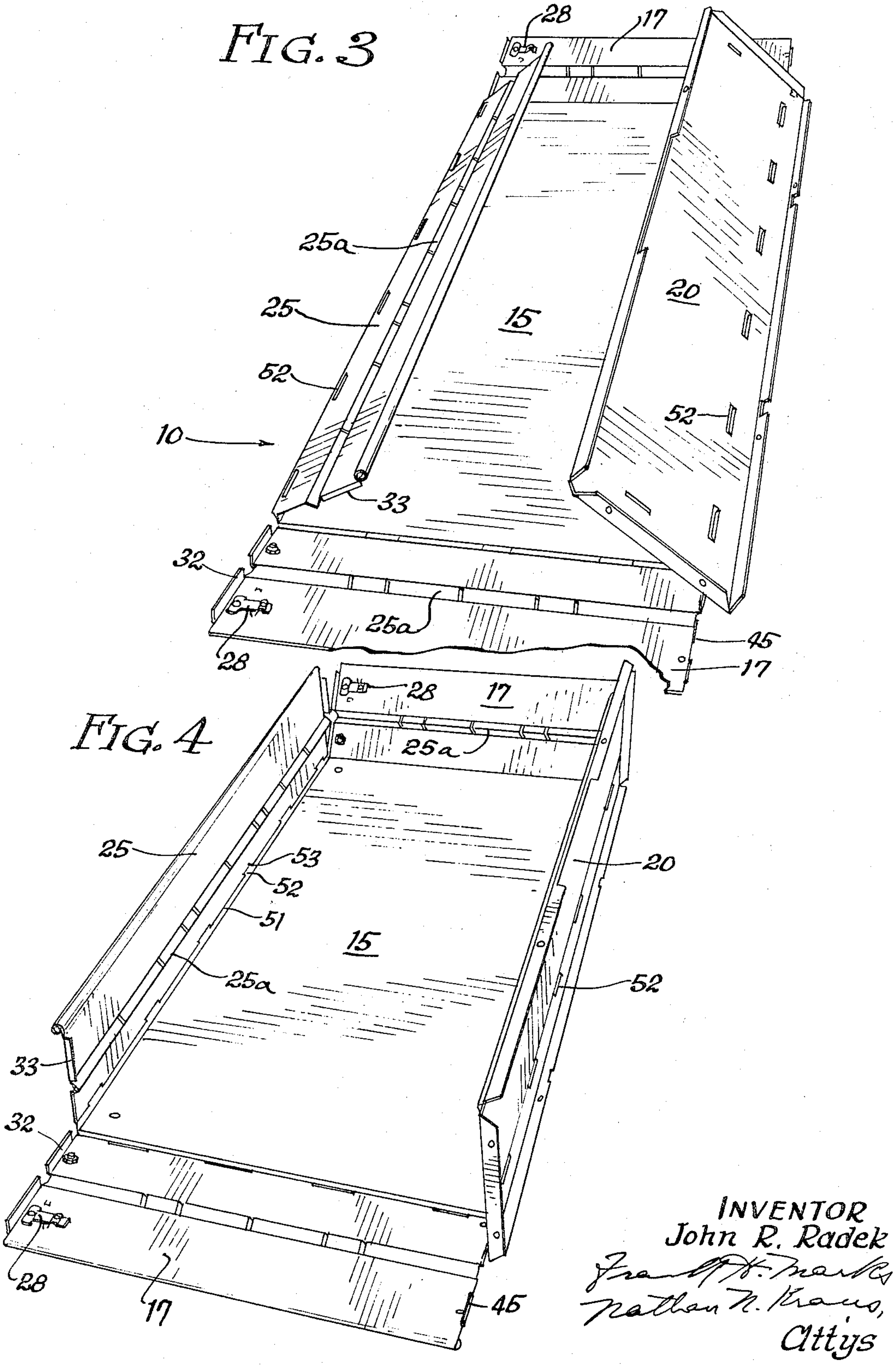
FIG. 3 is a top perspective view of said drawer in partially collapsed condition.
FIG. 4 is a perspective view similar to FIG. 3, but with the sides partly erected.

The drawer just described will be packed in a suitable carton and shipped flat, substantially in the condition shown in FIG. 3, with the side panels 17, 17 extended from and in the same plane as bottom panel 15, and with the front and back panels 20 and 25 overlying said bottom panel.

When it is desired to erect said drawer, the front and back panels are first raised through an arc of 90° away from the bottom panel, as illustrated in FIG. 3. After said front and back panels are disposed vertically or normal to the bottom panel, the side panels 17, 17 will then be rotated through approximately 90° to an erect position. When a side panel is brought into juxtaposition to the front and back panels, flange 32 at the back of said side panel will overlie the outside of said back panel 25 while flange 33 at the end of said back panel will lie in close juxtaposition to the inner face of the side panel, as seen in FIGS. 6 and 7. At this point latch 28 or the inside of the side panel will be rotated from the position seen in FIG. 6 to the point where it overlies flange 33, as seen in FIG. 7.

Side panels 17, 17, will be provided at the front end thereof with a flange 45 (FIG. 5) bent normally from the plane of panel 17 and adapted to engage under the marginal portion 46 of a plate 47 secured to the inner face of front panel 20 as by welding or the like. Adjacent said flange 46 is a slot 40.

Figure 2:
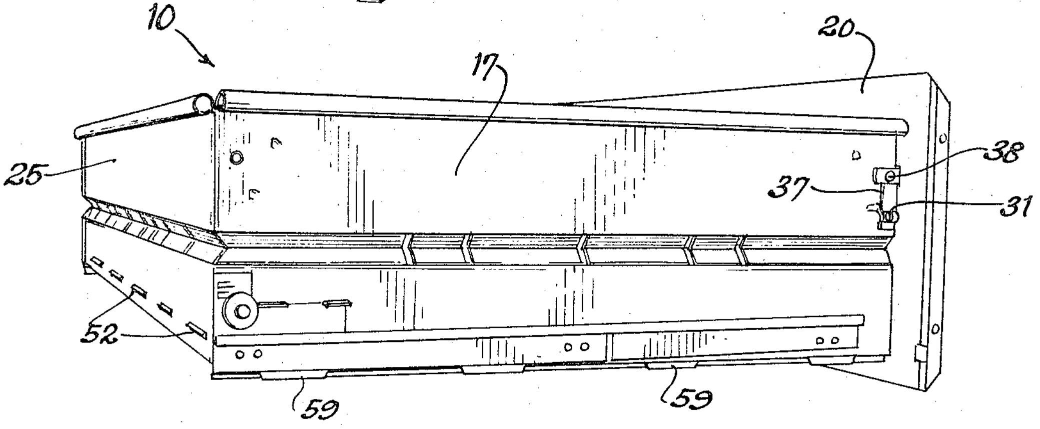
FIG. 2 is a side-rear perspective view of the same.

Thus, after a side panel 17 has been moved into its vertical position with flange 45 seated snugly between flange 46 and front panel 20, a latch 37 (similar to latch 28) on the side panel will be rotated into a slot 40 of the front panel, thus locking the side panel securely to the front panel. (FIG. 2.)

It will be understood that a finishing or ornamental panel 55 will normally be slid over front panel 20, as fully disclosed in my aforesaid copending application, said finishing panel preferably being provided on the front thereof with handles, knobs or the like for convenient manipulation.

Also, it will be understood that, after erection, a drawer as described above may be mounted in any suitable cabinet, table, or the like, such as the equipment disclosed in my aforesaid copending application.

Figures 9, 10:
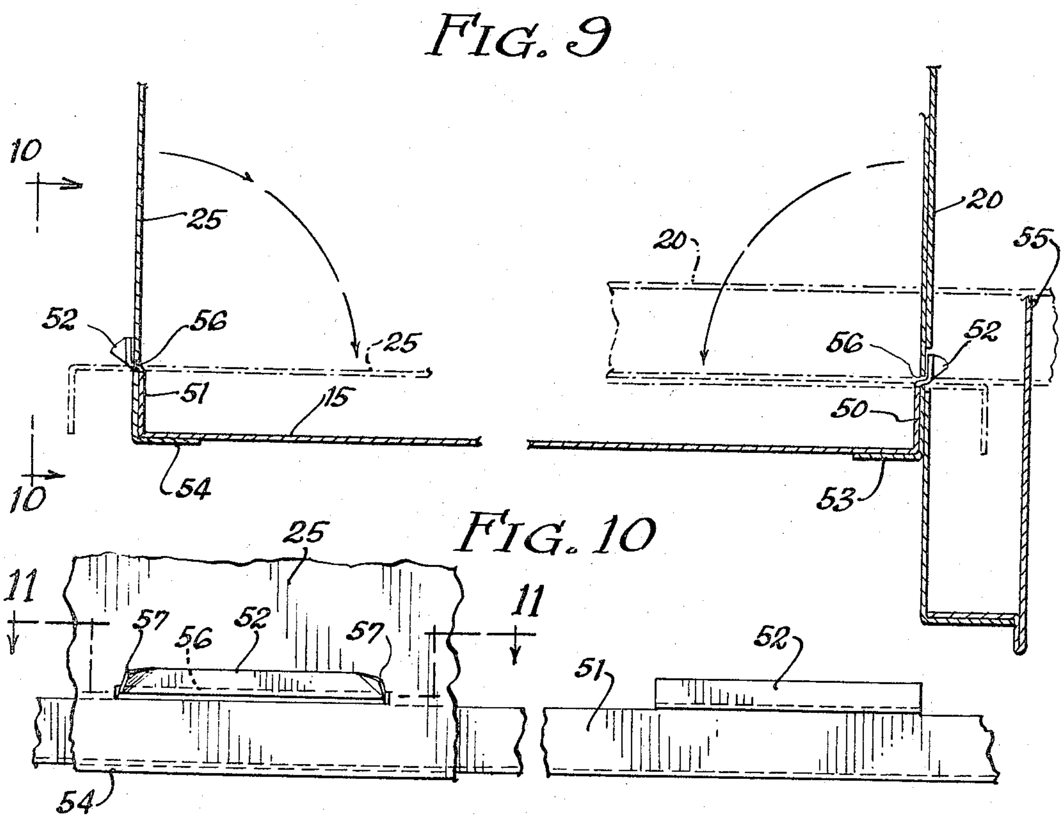
FIG. 9 is a fragmentary longitudinal sectional view through said improved drawer.
FIG. 10 is a fragmentary elevational view taken substantially along the line 10—10 of FIG. 9.
Figure 11:
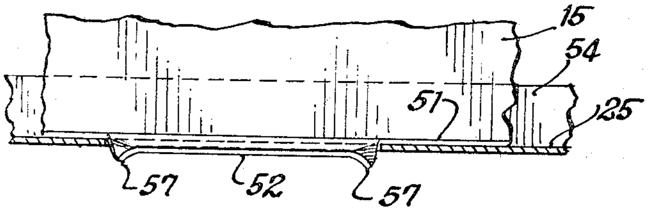
FIG. 11 is a fragmentary plan-section taken substantially along the line 11—11 of FIG. 10.

Referring to FIGS. 9–11, the hinge connections which connect the bottom panel 15 to the front and back panels 20 and 25, respectively, are all of the same type. As will be seen, the bottom panel 15 is provided with front and back upstanding flanges 50 and 51, respectively, each of which has a plurality of spaced integral tongues 52. Said tongues are bent outwardly and angularly as illustrated in FIG. 9.

The front and rear panels 20 and 25, respectively, are provided with bottom flanges 53 and 54, respectively, arranged to underlie the bottom panel 15. Each panel has a plurality of elongated slots 56 arranged in longitudinal alignment and spaced upwardly from the flange. Each slot 56 is adapted to register with a respective tongue 52 which extends through the slot. After assembly, the corners 57 of each tongue are bent out of the plane of the tongue, as illustrated in FIGS. 10 and 11. This serves to retain the parts against separation but permits pivotal movement between the parts, in the manner illustrated by the arrows in FIGS. 9, so that the front and back panels 20 and 25, respectively, may be folded over on the bottom panel 15 for storage or shipment or may be erected to operative position as illustrated in FIG. 4. However, by the construction just described the front and back panels 20 and 25 are locked against rotation from their upstanding positions away from the bottom panel by the outstanding flanges 53 and 54 (FIGS. 3, 4 and 9), thus making for a rugged assembly when erected, while being free to rotate toward positions overlying the bottom panel for collapsing.

Figure 8:
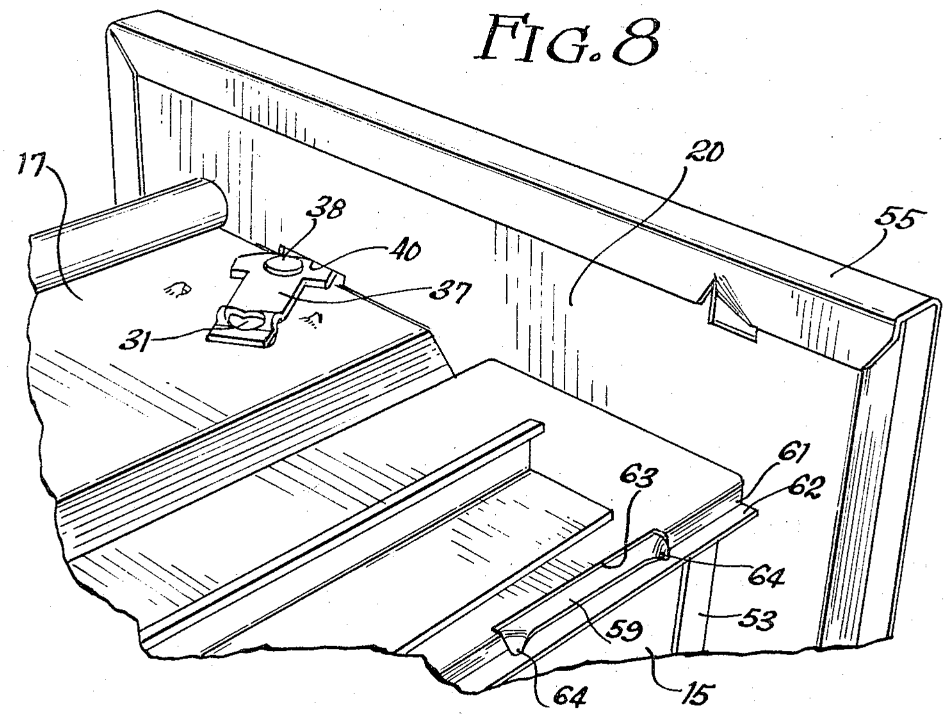
FIG. 8 is an enlarged fragmentary perspective showing the locked condition between a side and front panel of the drawer.
Figure 12:
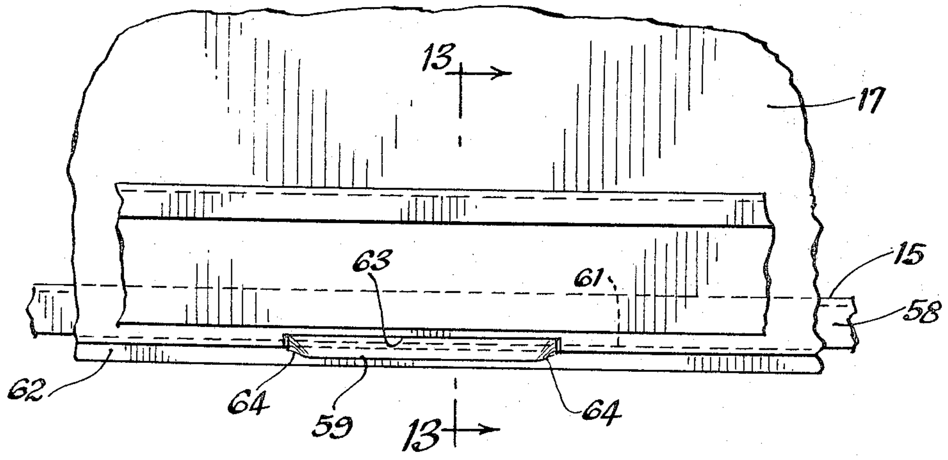
FIG. 12 is a fragmentary elevational view of the lower portion of a side panel of said drawer as indicated by the line 12—12 of FIG. 13.
Figure 13:
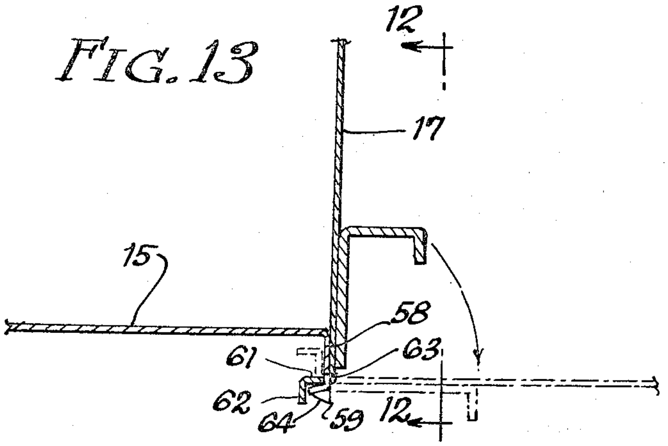
FIG. 13 is a fragmentary vertical sectional view through the bottom and a side wall taken substantially along the line 13—13 of FIG. 12.

FIGS. 8, 12 and 13 illustrate the hinge connections connecting the bottom panel with the side panels 17, 17. Here the bottom panel 15 is provided along each side edge with a downwardly turned flange 58 having a plurality of spaced integral tongues 59. Each of the side panels 17, 17 has an inwardly bent flange 61 along its bottom edge arranged to underlie the bottom panel 15 in spaced relation, said flange having a terminal off-set portion 62 extending parallel to the plane of the side panel.

At the juncture of the flange 61 and the main body of panel 17 a plurality of spaced slots 63 is provided, each arranged to register with a respective tongue 59. After the parts are assembled the corner portions 64 of each tongue are bent out of the plane of the tongue as illustrated in FIGS. 8 and 13. This serves to retain the parts against separation but permits relative pivotal movement in the direction of the arrows in FIG. 3 so that for storage or shipment the side panels may be folded outwardly away from bottom panel 15 to a position substantially in the plane of the bottom panel, as illustrated in FIGS. 3, 4 and 13. Thus, it is apparent that side panels 17 are so attached to bottom panel 15 as to be locked in their upstanding positions against rotation toward said bottom panel by abutment against flange 58, thus making for a rugged assembly when erected, while being free to rotate away from said bottom panel, as seen clearly in FIGS. 3, 4 and 13.

Generally U-shaped bars G welded or brazed to the lower outer faces of side panels 17 provide channels or guides for receiving anti-friction rollers (not shown) mounted in a cabinet housing my improved drawer, in a well-known manner. (FIGS. 12 and 13.)

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A knockdown drawer, comprising:

(a) a rectangular bottom panel, (b) a pair of lateral rectangular panels pivotally connected to one pair of opposed edges of said bottom panel, (c) a second pair of lateral rectangular panels pivotally connected to the other pair of opposed edges of said bottom panel, (d) said lateral panels being movable between their upstanding positions in vertical planes in the erected condition of the drawer and their knockdown horizontal positions, for convenient packing, (e) hinge means between one pair of said panels and said bottom panel requiring their movement in a single direction into a single horizontal plane in overlying relation to the bottom panel, (f) hinge means between the other pair of said panels and said bottom panel requiring their movement in a single direction into a horizontal plane substantially coextensive with that of said bottom panel, so that when the drawer is collapsed there will be no more than two generally parallel superposed planes of panels, and (g) cooperating means on the lateral panels of each pair adjacent to the adjoining edges thereof for securing said lateral panels in upstanding position, including interengaging elements for preventing inadvertent detachment from each other.

2. A device as set forth in claim 1 wherein said hinge means between said bottom panel and lateral panels are formed solely by cooperating tongues and slots in the respective panels.

3. A device as set forth in claim 2 wherein said bottom panel is of sheet metal and is provided with the spaced tongues along the edges thereof which are adapted to cooperate with correspondingly spaced slots adjacent to the bottom edges of the lateral panels and which are maintained interconnected by bending the ends of said tongues at their protrusions beyond the respective slots through which they project.

4. A device as set forth in claim 2 wherein said bottom panel of sheet metal is provided with upstanding flanges at the front and back thereof with the tongues spaced from each other and extending upwardly from said flanges, said first pair of lateral panels having longitudinal slots therein in positions corresponding to said spaced tongues and at the level of the junction of the latter with the upstanding flanges, each of said lateral panels also having a horizontal flange adjacent to the bottom edge thereof adapted to be disposed below the respective front and back edges of the bottom panel in the upstanding position of each lateral panel and to project beyond said respective edges when the lateral panels are swung into overlying relation to said bottom panel.

5. A device as set forth in claim 4 wherein said tongues are slightly off-set outwardly from the planes of said upstanding flanges.

6. A device as set forth in claim 3 wherein said bottom panel of sheet metal is provided with downwardly extending flanges at the opposite sides thereof with the tongues spaced from each other and extending downwardly from said flanges, said second pair of lateral panels each having an inwardly directed flange with longitudinal slots therein in positions corresponding to said spaced tongues and at the level of the junction of the latter with the downwardly extending flanges, at least part of said tongues adapted to be distorted from the planes thereof to retain the slotted lateral panels interconnected with the bottom panel as the lateral panels are swung from upstanding position adjacent to the downwardly extending flanges to positions extending outwardly from said bottom panel.

7. A device as set forth in claim 2 wherein said bottom panel of sheet metal is provided with upstanding flanges at the front and back thereof with the tongues spaced from each other and extending upwardly from said flanges, said first pair of lateral panels having longitudinal slots therein in positions corresponding to said spaced tongues and at the level of the junction of the latter with the upstanding flanges, each of said lateral panels also having a horizontal flange adjacent to the bottom edge thereof adapted to be disposed below the respective front and back edges of the bottom panel in the upstanding position of each lateral panel and to project beyond said respective edges when the lateral panels are swung into overlying relation to said bottom panel, said bottom panel also being provided with downwardly extending flanges at the opposite sides thereof with the tongues spaced from each other and extending downwardly from said flanges, said second pair of lateral panels each having an inwardly directed flange with longitudinal slots therein in positions corresponding to said spaced tongues and at the level of the junction of the latter with the downwardly extending flanges, at least part of said tongues adapted to be distorted from the planes thereof to retain the slotted aforementioned lateral panels interconnected with the bottom panel as the lateral panels are swung from upstanding vertical positions to horizontal positions.

8. A knockdown drawer, comprising:

(a) a rectangular bottom panel having on one side a marginal flange bent approximately normally in one direction away from the plane of said bottom panel and a marginal flange on an adjacent side bent approximately normally in the opposite direction away from the plane of said bottom panel, (b) at least three normally upstanding panels having adjoining vertical edges when erected, (c) hinge means joining the upstanding panels to the bottom panel, (d) said hinge means being so constructed that the normally upstanding panels may be collapsed to substantially horizontal position for convenient packing, (e) the hinge means of one of each pair of adjoining upstanding panels permitting it to fold only into a position overlying the bottom panel, while (f) the hinge means of the other of each pair of adjoining panels permits it to fold only into a position in extension of the bottom panel, so that, when the drawer is collapsed, there will be no more than two superposed panels lying in generally parallel planes, (g) said hinge means constituted by interengaging tongue and slot connections between said bottom wall flanges and said upstanding panels, the tongues being deformed after passage through said slots to prevent inadvertent disengagement of said panels, (h) said parts being so constructed and arranged that the two opposite panels can be rotated about 90° in only one direction relative to the bottom panel from their upstanding positions while the intermediate panel can be rotated about 90° only in the opposite direction from its upstanding position, so as to provide a relatively thin collapsed unit, and (i) means for securing together each pair of adjoining upstanding panels adjacent their adjoining edges, said securing means including interengaging elements adjacent said edges for positively retaining both of said panels from inadvertent detachment from the other.

References Cited

UNITED STATES PATENTS

| | | | |
|---|---|---|---|
| 1,033,831 | 7/1912 | Scott et al. | 220—7 |
| 1,369,704 | 2/1921 | Parker | 220—7 |
| 1,809,523 | 6/1931 | McLean | 220—7 |

FOREIGN PATENTS

| | | |
|---|---|---|
| 195,512 | 4/1923 | Great Britain. |

THERON E. CONDON, *Primary Examiner.*

RAPHAEL H. SCHWARTZ, *Examiner.*